(12) United States Patent
Tsai (10) Patent No.: US 9,842,078 B2
(45) Date of Patent: Dec. 12, 2017

(54) DATA TRANSMISSION ARCHITECTURE

(71) Applicant: Hsiung-Kuang Tsai, Taipei (TW)

(72) Inventor: Hsiung-Kuang Tsai, Taipei (TW)

(73) Assignee: Slim HMI Technology, Taipei (TW)

( * ) Notice: Subject to any disclaimer, the term of this patent is extended or adjusted under 35 U.S.C. 154(b) by 121 days.

(21) Appl. No.: 14/437,790

(22) PCT Filed: Oct. 22, 2012

(86) PCT No.: PCT/CN2012/083274
§ 371 (c)(1),
(2) Date: Apr. 22, 2015

(87) PCT Pub. No.: WO2014/063277
PCT Pub. Date: May 1, 2014

(65) Prior Publication Data
US 2015/0301971 A1    Oct. 22, 2015

(51) Int. Cl.
*G06F 13/40* (2006.01)
*G09G 5/00* (2006.01)
(Continued)

(52) U.S. Cl.
CPC ....... *G06F 13/4027* (2013.01); *G09G 3/2096* (2013.01); *G09G 5/003* (2013.01);
(Continued)

(58) Field of Classification Search
CPC .. G06F 13/4027; G09G 3/2096; G09G 5/003; H04W 4/008
See application file for complete search history.

(56) References Cited

U.S. PATENT DOCUMENTS

2003/0150853 A1* 8/2003 Kang .................. H05B 6/6435
219/720
2011/0057861 A1* 3/2011 Cok .................... H01L 27/3293
345/1.3
(Continued)

FOREIGN PATENT DOCUMENTS

CN          102135947 A    7/2011
CN          102693034 A    9/2012
(Continued)

*Primary Examiner* — Henry Tsai
*Assistant Examiner* — John Roche
(74) *Attorney, Agent, or Firm* — Muncy, Geissler, Olds & Lowe, P.C.

(57) ABSTRACT

A data transmission architecture includes a local system and a peripheral system. A core computing unit and the peripheral hub of the local system integrate display data and transmission data and transmit integrated data to the image transmission unit. A driving circuit of a display panel of the image transmission unit is utilized to transform the integrated data into a first electrical signal. A data transmission between the local system and the peripheral system utilizes at least one electrode of the display panel to transmit the first electrical signal to retrieve the transmission data. A transmitting device of the peripheral system transmits a second electrical signal. A receiving device of image transmission unit retrieves the second electrical signal. Then the receiving device transmits the second electrical signal to the peripheral hub. Accordingly the data transmission architecture can be utilized in data/files transmission, and cooperating with existing transmission system.

10 Claims, 5 Drawing Sheets

(51) Int. Cl.
*H04W 4/00* (2009.01)
*G09G 3/20* (2006.01)
*G09G 3/36* (2006.01)

(52) U.S. Cl.
CPC .......... *H04W 4/008* (2013.01); *G09G 3/3648* (2013.01); *G09G 2370/16* (2013.01)

(56) References Cited

U.S. PATENT DOCUMENTS

2011/0304583 A1* 12/2011 Kruglick ................ G06F 3/044
345/174
2012/0133599 A1* 5/2012 Cho ...................... G06F 3/0412
345/173

FOREIGN PATENT DOCUMENTS

TW 200714963 A 4/2007
WO WO 2011/155939 A1 12/2011

\* cited by examiner

DATA TRANSMISSION ARCHITECTURE

BACKGROUND OF THE INVENTION

Field of Invention

The invention relates to a data transmission architecture.

Related Art

In recent years, for increasing the applications of consumer electronic devices, some companies added the near field communication, NFC, (or short range communication) function into an electronic device. NFC (or short range communication) can, within the user reachable range, provide a connection without physical wiring so that information, such as commands, music, pictures, business cards, data, or files can be transferred from an electronic device to another electronic device. In addition to the convenience of transmission between electronic devices, it can also extend the applications, such as the situation requiring IC card, for example, access control system, tickets, payment by credit card, or situation to receive advertising messages, such as receiving coupons form store's screen via Bluetooth communication.

It is becoming an inevitable trend that to equip an electronic device with near field communication function. Therefore, in view of expanding the applications, a plan to work out a new architecture of short range communication for electronic device has been actively developed by the industry.

SUMMARY OF THE INVENTION

An objective of the present invention is to provide a new data transmission architecture for transmitting data in short range wirelessly. This data transmission architecture can transmit data or files in short range and can act jointly with an existing communication system. For example, a local system using this architecture can transmit data or file to a peripheral system in a short range through signal coupling or the peripheral system can transmit the data to the local system. Thus the applications of an electronic system can be expanded.

The present invention can be implemented by following technical solutions.

The data transmission architecture includes a local system and a peripheral system. The local system includes at least one core computing unit, an image transmission unit and a peripheral hub. The peripheral hub connects electrically with the core computing unit and image transmission unit, respectively. The image transmission unit includes a display panel and a receiving module. The display panel includes at least one electrode and a driving circuit. A display data and a transmission data are integrated and processed by the core computing unit and the peripheral hub, and then transmitted to the image transmission unit. The driving circuit receives the display data and the transmission data, and converts into a first electrical signal. The peripheral system includes a receiving device and transmitting device. The information transmission between the local system and the peripheral system is achieved by one of the following ways: the first electrical signal is transmitted by the at least one electrode and the receiving device couples the first electrical signal to receive the transmission data, or the transmitting device transmits a second electrical signal which received by the receiving module to obtain a receiving data and the receiving module transmits the receiving data to the peripheral hub.

In one embodiment, the transmission data can be a picture, video, sound data, text document, password, encoded file or a combination of those.

In one embodiment, the at least one electrode is a standalone electrode of the display panel or one of the plural column electrodes or plural row electrodes of the display panel.

In one embodiment, the transmission data includes a data tag, and the data tag includes the information of the receiving side, i.e., the peripheral system.

In one embodiment, the transmission data includes a data tag, and the data tag includes information of the transmitting side, i.e., the local system.

In one embodiment, the receiving data includes a data tag, and the data tag includes information of the receiving side, i.e., the local system.

In one embodiment, the receiving data includes a data tag, and the data tag includes information of the transmitting side, i.e., the peripheral system.

In one embodiment, according to the content of receiving data, the peripheral hub transmits the receiving data to another unit of the local system or other peripheral systems.

In one embodiment, the display data and the transmission data are integrated by a software program, hardware, or firmware.

In one embodiment, the image transmission unit further includes a transmitting module and the information transmission between the local system and the peripheral system further includes: transmitting the transmission data through the electrode of the display panel or the transmitting module separately or simultaneously.

In one embodiment, the peripheral system includes a Bluetooth device, or a radio frequency unit, or a speaker, or a microphone, or a camera, or a video camera, or a multifunction printer, or a keyboard, or a mouse, or a storage device, or a payments device, or a cash machine, or a data query device or their combination.

According to above descriptions, in the data transmission architecture of the present invention, the information transmission between the local system and the peripheral system is achieved by one of the following ways: the first electrical signal is transmitted by the at least one electrode of the display panel of the image transmission unit and the receiving device of the peripheral system couples the first electrical signal to receive the transmission data; or the transmitting device of the peripheral system transmits a second electrical signal which is received by the receiving module of the image transmission unit to obtain a receiving data and the receiving module transmits the receiving data to the peripheral hub. In addition to transmitting data or files in short range, the data transmission system of the present invention can collaborate with the existing communication system to expand the applications of the electronic system. Also, in this invention, the display panel of the image transmission unit of the local system is not only for displaying images but also for transmitting data within a short range to expand the applications of the electronic system.

DETAILED DESCRIPTION OF THE INVENTION

The present invention will be apparent from the following detailed description, which proceeds with reference to the accompanying drawings, wherein the same references relate to the same elements.

Figure 1:
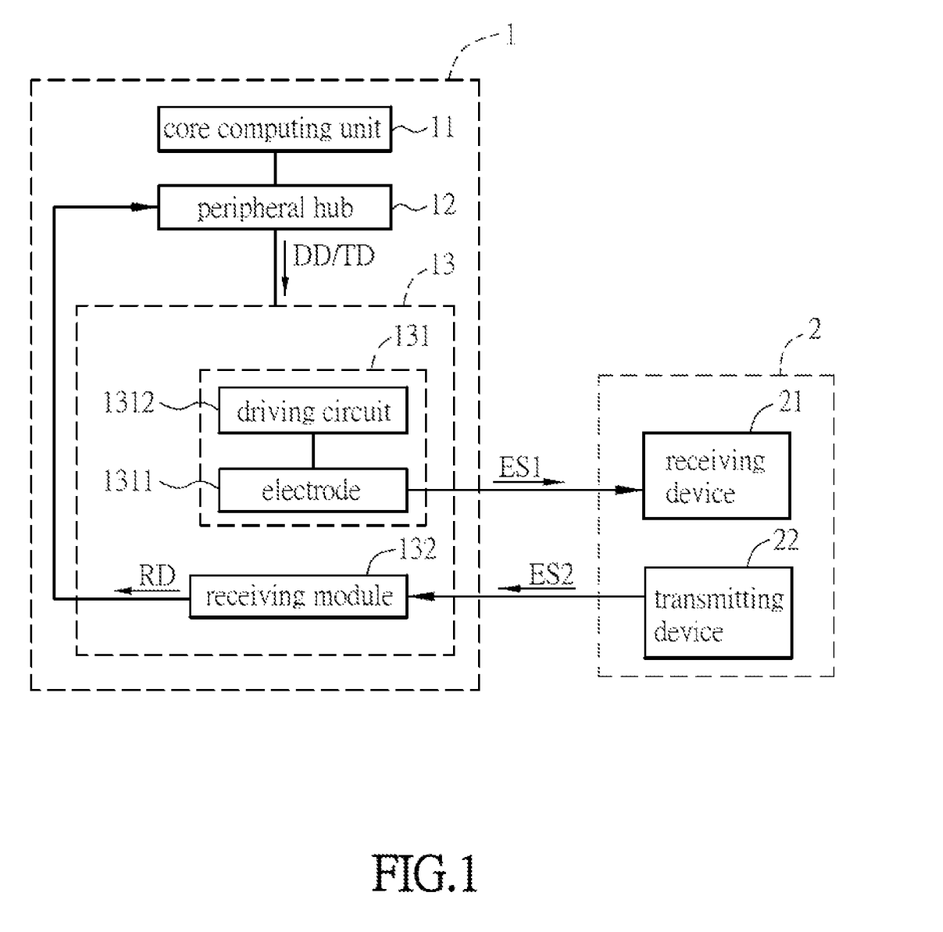
FIG. 1 is a function block diagram of a data transmission architecture according to a preferred embodiment of this invention.

Referring to FIG. 1, it is a function block diagram of a data transmission architecture according to a preferred embodiment of this invention.

The data transmission architecture includes a local system 1 and a peripheral system 2. The local system 1 is coupled to the peripheral system 2 via at least one wireless electrical coupling so that data can be transmitted from the local system 1 to peripheral system 2. The local system 1 and the peripheral system 2 can, respectively, include independent functional systems such as a processing system, a storage system, or a transmission system and so on. And the "system" may consist of hardware, software, firmware or their combination.

The local system 1, with a separate central processing unit (CPU) and operating system that can support independent operation, may be a mobile phone, a computer (such as tablet, notebook), a public information display, a billboard, an electrical whiteboard, a personal digital assistant or a combination of those. Additionally, the peripheral system 2 can be a passive device or a device with an independent CPU and operation system that can work independently and may include a docking station, a mobile phone, a computer, a Bluetooth device, a radio frequency unit, a speaker, a microphone, a camera, a video camera, a multi-function printer, a keyboard, a mouse, a storage device, a payments device, a cash machine, a data query device or a combination of those.

As shown in FIG. 1, the local system 1 includes at least one core computing unit 11, a peripheral hub 12 and an image transmission unit 13. The peripheral system 2 includes a receiving device 21 and a transmitting device 22.

The core computing unit 11 can be a CPU for computing data. The peripheral hub 12 is for connecting the core computing unit 11 with other devices and can gather and fulfill the requests for all connected devices. For instance, the core computing unit 11 requests data from the storage device or the other device requests data computing from the core computing unit 11. In addition to the receiving device 21 and the transmission device 22, the peripheral system 2 further can include other receiving or transmitting modules or units. For instance, the peripheral system 2 can include a wire or wireless local area network (the wireless module can be a WiFi or WLAN), a Bluetooth module, a telecommunication network module, a radio frequency module, or a combination of those. Additionally, the local system 1 and the peripheral system 2 can include other devices, units or components, for instance, the data storage device or other data computing device which is not restricted.

The peripheral hub 12 is electrically connected with the core computing unit 11 and the image transmission unit 13. The core computing unit 11 and the peripheral hub 12 can process and integrate a display data DD and a transmission data TD, and transmit to the image transmission unit 13 afterward. The integration and processing of the display data DD and transmission data TD can be done by a software, hardware, or firmware. In addition, the display data DD and transmission data TD can be generated via an internal or external command of the local system 1 on data from the memory of local system 1 or from an external device by transmission. The display data DD can be a grey scale data of image frames of the display panel 131. The transmission data TD can be a stream of digital data or file, such as images, video or sound data, text document, password or encoded file or a combination of those.

The image transmission unit 13 includes a display panel 131 and a receiving module 132. The display panel 131 can be a liquid crystal display panel (LCD panel) or an organic light emitting diode display panel (OLED panel). The display panel 131 includes at least one electrode 1311 and a driving circuit 1312. The driving circuit 1312 can be driver ICs that are located outside the display panel 131 or a driving circuit integrated on the display panel 131. The display panel 131 further includes a pixel matrix which can be an active matrix or a passive matrix. The display panel 131 further includes a plurality of row electrodes (ex: scan line, not shown in figure), a plurality of column electrodes (ex: data line, not shown in figure) and a plurality of pixel electrodes. The row electrodes and the column electrodes are crisscross disposed. The electrode 1311 can be a stand-alone electrode of the display panel 131 or one of the row or column electrodes of the display panel 131, which is not limited. The display panel 131 further includes a plurality of transistors (not shown) that are electrically connected to the column electrodes, row electrodes and the pixel electrodes.

Additionally, in traditional communication technology, the transmitter and receiver should match with each other by adopting the same communication technology or protocol in order to form the data transmitting and receiving functions for the bi-directional data exchange. However, the data transmission architecture of this invention is different from the traditional technology that a unidirectional data transmission, from display panel 131 to receiving device 21, is established so that the transmission data TD can be transmitted from local system 1 to peripheral system 2. Therefore, the display panel 131 and the receiving device 21 should use the same communication technology or protocol. On the other hand, when the data is transmitted from the peripheral system 2 to the local system 1, the data is transmitted from the transmitting device 22 to the receiving module 132. The transmitting device 22 and the receiving module 132 should also use the same communication technology or protocol which may not be the same as the communication technology or protocol between the display 131 and the receiving device 21. It may even utilize an existing bi-directional data exchange technology for the transmitting device 22 and receiving module 132, for example, a wire or wireless local area network module (the wireless module can be a WiFi or WLAN), a Bluetooth module, a telecommunication network module, a radio frequency module or a combination of those.

After receiving the display data DD and the transmission data TD, the driving circuit 1312 can convert the display data DD and the transmission data TD into a first electrical signal ES1. The conversion of data may include serial-to-parallel conversion, encoding, encryption, adding header information, or other conversion processes. It is noted that in the serial-to-parallel conversion, the serial data can be converted in sequential order or interlaced order or their combination.

The way of data transmission from local system 1 is different from the conventional communication system that at least one electrode of the display panel 131 of local system 1 can be used as a transmitter for the data transmission. Spatial separation or modulation technology can be applied to these communication channels for simultaneous or non-simultaneous transmission and reducing the interference between the channels. The first electrical signal ES1 is transmitted by the electrode 1311 of the display panel 131. The transmission data TD can be transmitted, for example, between the time interval of the display data DD (blanking time), such as between two frames, or between the scanning of two row electrodes, or in the interval created by shortening the driving time of display data DD, or by superimposing a signal, with higher frequency than display data DD, on the display data DD directly.

In the data transmission architecture of this invention, the information transmission between the local system 1 and the peripheral system 2 includes one of the following ways: the first electrical signal ES1 is transmitted via the electrode 1311 of the display panel 131 of the image transmission unit 13, and the first electrical signal ES1 is coupled and received by the receiving device 21 of the peripheral system 2 to receive the transmission data TD; or a second electrical signal ES2 is transmitted via the transmitting device 22 of peripheral system 2, received by the receiving module 132 of the image transmission unit 13, and formed a receiving data RD that is further transmitted to peripheral hub 12 from the receiving unit 132. The display panel 131 and the receiving module 132 of the image transmission unit 13 perform, respectively, as the transmitting and receiving channels for data transmission (functioning like a connecting port) so that local system 1 can establish data exchange with external peripheral system 2 via the image transmission unit 13. The display panel 131 not only displays the image, but also functions as a channel to connect with external system. The first electrical signal ES1 is transmitted from the electrode 1311 in a wireless way and the transmission of second electrical signal ES2 from transmitting device 22 can be either wire or wireless (such as Bluetooth or WiFi). Because the transmission path of the first electrical signal ES1 and the second electrical signal ES2 are different, the first electrical signal ES1 and the second electrical signal ES2 will not interfere with each other and it does not matter whether the respective data are transmitted simultaneously or not, or in different order, or for representing different or same contents, or using same or different signal formats.

To be more specific, when the peripheral system 2 is near to the display panel 131 of the image transmission unit 13 (contacted or not), the local system 1 can transmit the first electrical signal ES1 via the electrode 1311 of the display panel 131 and the first electrical signal ES1 is coupled (such as capacitive coupling or inductive coupling) and received by the receiving device 21 of the peripheral system 2. The coupling is a wireless method that signals are transmitted by near field. For different applications, the first electrical signal ES1 or the second electrical signal ES2 can be formed by any information to be transmitted, such as image data, sound data, text data, password data, encoded data or a combination of those.

When the peripheral system 2 includes other receiving devices or modules other than the receiving device 21 or there are other peripheral systems existing simultaneously, the transmission data TD may include a data tag in order to identify to which receiving device or peripheral system the data is transmitted. The data tag includes the information of receiver (i.e., the information to identify the destination of transmission data TD, such as which receiving device 21 or peripheral system) to ensure the correct delivery of information. In other words, with the data tag in the transmission data TD, the receiving device 21 can recognize whether it is the correct receiver of transmission data TD or not after receiving the first electrical signal ES1 and may ignore the transmission data TD when it is transmitted for other devices or peripheral systems. The data tag of the transmission data TD can include information of the local system 1 (the sender information) so that the peripheral system 2 can recognize which local system, or which module or device of the local system, sends the transmission data TD. The data tag can be added into the transmission data TD by the core computing unit 11 and the peripheral hub 12. In the same way, the receiving data RD can include a data tag with the sender information (from which peripheral system or transmitting device 22 of peripheral system 2 that the receiving data RD is transmitted) or receiver information (to which local system or receiving module of local system that the receiving data RD is sent).

Additionally, after the receiving module 132 receives the receiving data RD, the receiving data RD can be sent to the peripheral hub 12. When the receiving data RD is received by the peripheral hub 12, the peripheral hub 12 can perform the corresponding processes according to the content of receiving data RD. For instance, the receiving data RD can be sent to another unit of the local system 1, such as to a memory device for storage, or to core computing unit 11 for computing, or to another peripheral system through the transmitting channel, like display panel 131 or other transmission modules or devices.

Figure 2:
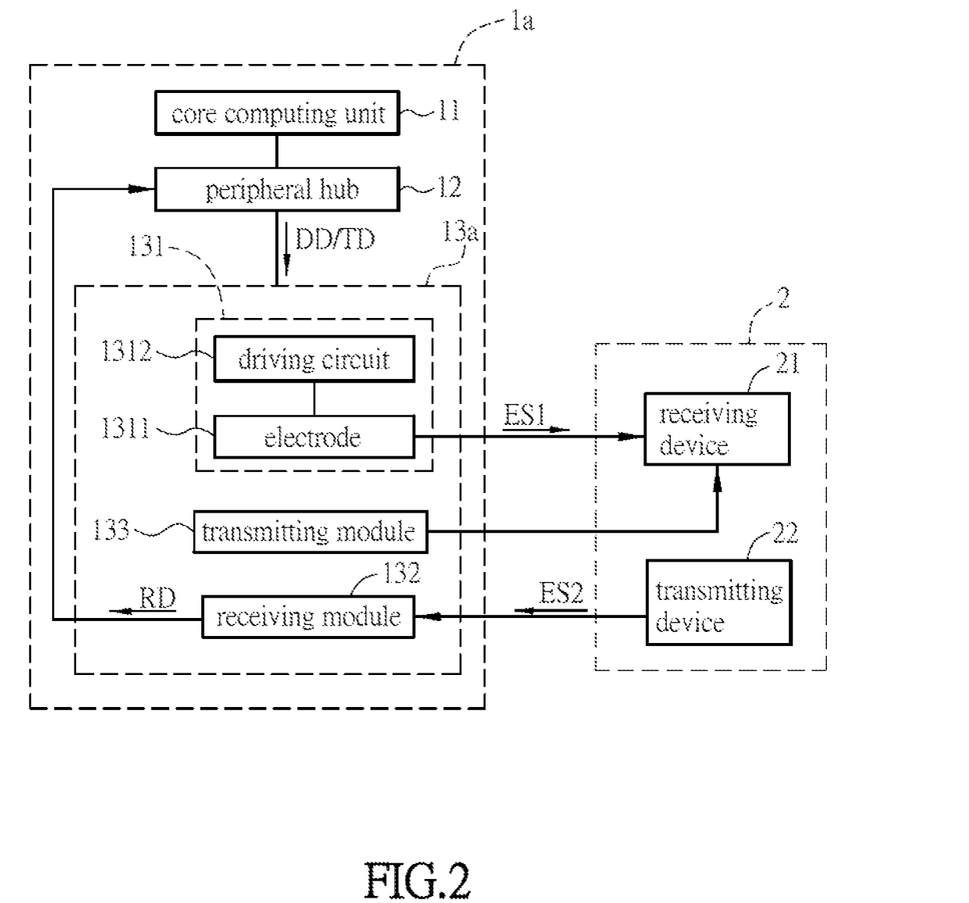
FIG. 2 is a function block diagram of a data transmission architecture according to another preferred embodiment of this invention.

FIG. 2 is a function block diagram of a data transmission architecture according to another embodiment of the present invention.

Different from the data transmission architecture in FIG. 1, in the data transmission architecture of FIG. 2, the image transmitting unit 13a of local system 1a can further include a transmitting module 133 and the information transmission between local system 1a and peripheral system 2 may further include: transmitting the transmission data TD, simultaneously or separately, through the electrode 1311 of the display panel 131 or through the transmitting module 133. In other words, the local system 1a can use both the display panel 131 and the transmitting module 133 of the image transmitting unit 13a as transmission channels to transmit the transmission data TD to peripheral system 2 simultaneously or separately. And, by comparing the content of two received transmission data TD, the peripheral system 2 can not only verify any problems during the transmission process but also confirm the transmission data TD is correct or not. Or, the peripheral system 2 can use the transmission data from display panel 131 for verifying personal identity or activating the function of transmitting large size data or in high speed via the transmitting unit 133. The transmitting module 133 can be a wire or wireless (such as Bluetooth or WiFi) type transmission module.

Figure 3:
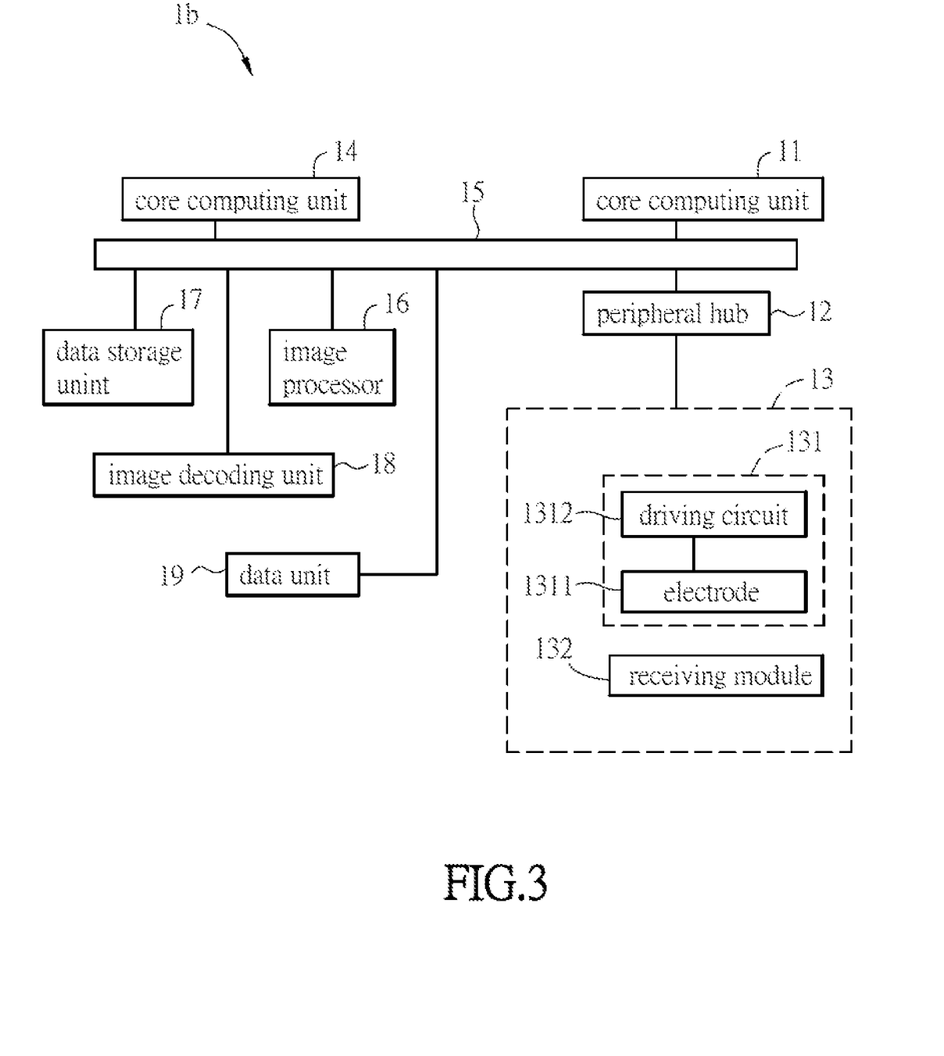
FIGS. 3-5 are function block diagrams of different types of local systems of this invention.
Figure 4:
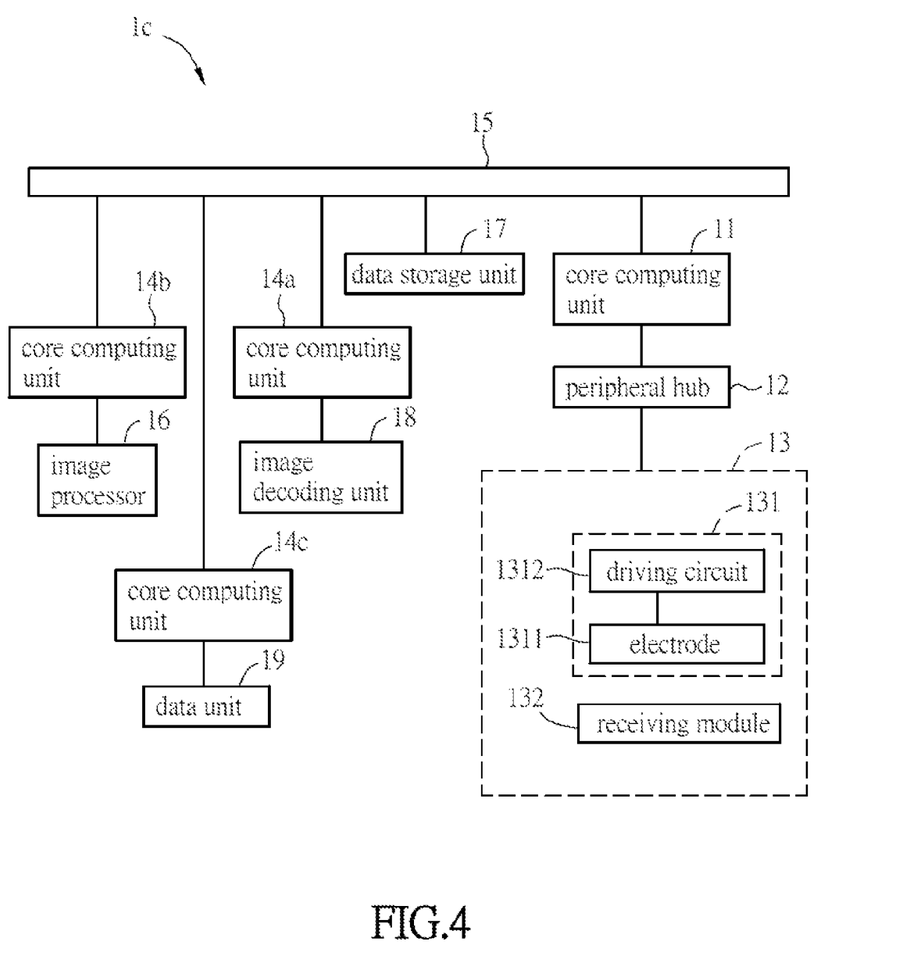
Figure 5:
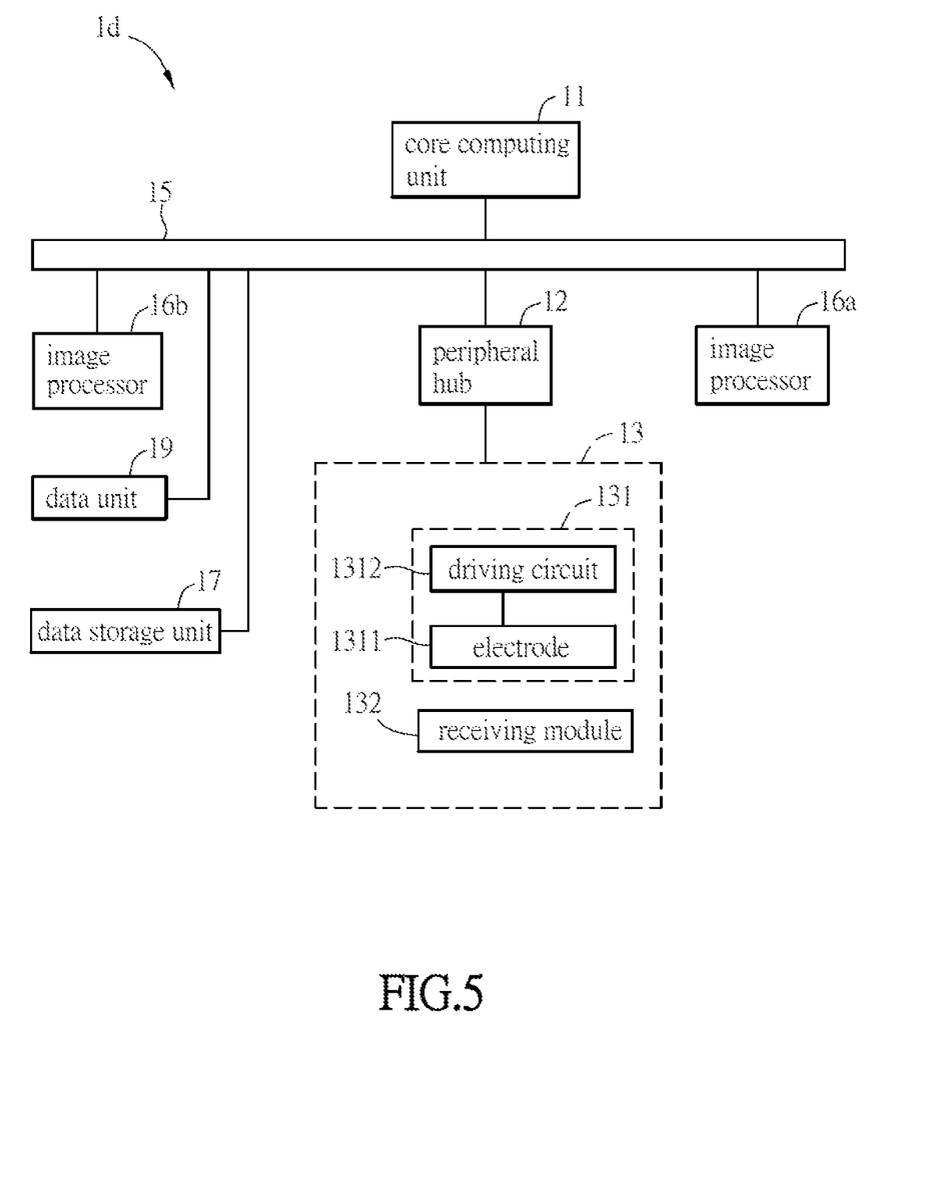

FIGS. 3-5 are function block diagrams of different types of local systems 1b, 1c, 1d of the present invention.

As shown in FIG. 3, the local system 1b, different from the local system 1 in FIG. 1, includes another core computing unit 14, a bus 15, an image processor 16, a data storage unit 17, an image decoding unit 18 and a data unit 19. The core computing units 11, 14, the peripheral hub 12, the image processor 16, the data storage unit 17, the image decoding unit 18 and the data unit 19 are connected by the bus 15 and can exchange data through bus 15. When the peripheral hub 12 receives the receiving data RD (not shown in figure), the receiving data RD can be sent to a corresponding device via the bus 15 for processing, for instance, if the receiving data RD is a high definition image, the receiving data RD can be sent to the image decoding unit 18 for decoding. Then the decoded image data is sent to and processed by the image processor 16 and, through bus 15 and peripheral hub 12, displayed by the image processing unit 13. Or, for the received signal from the data unit 19 (ex: Wifi, 3G or GPS), the data can be sent, via bus 15, to the data storage unit 17 for storing or to peripheral hub 12 for subsequent processing.

As shown in FIG. 4, the local system 1c is different from the local system 1 in FIG. 1 that the local system 1c includes more (3 units in FIG. 4) core computing units 14a, 14b, 14c, a bus 15, an image processor 16, a data storage unit 17, an image decoding unit 18 and a data unit 19. The core computing units 11, 14a, 14b, 14c and data storage unit 17 connect directly to bus 15 and the peripheral hub 12, image decoding unit 18, image processor 16, and data unit 19 are connected to bus 15 through core computing unit 11, 14a, 14b, and 14c, respectively. According to this structure, the data that should be processed in high speed and the data that can be processed in low speed can be sent to the corresponding core computing units for processing. For example, the data, which can be processed in low speed, is received via data unit 19 and, after processed by core computing unit 14c and through bus 15, is stored in data storage unit 17. On the other hand, the image signal requiring high speed processing can be handled first by the core computing unit 14b then, through bus 15, sent to the core computing unit 14a and image decoding unit 18 for other high speed processing.

As shown in FIG. 5, the local system 1d is different from the local system 1 in FIG. 1 that the local system 1d includes a bus 15, two image processors 16a, 16b, a data storage unit 17, and a data unit 19. The core computing unit 11, peripheral hub 12, image processor 16a, 16b, data storage unit 17 and data unit 19 are directly connected to the bus 15 respectively and can exchange data through bus 15. The data that received by data unit 19 or receiving module 132 of the image transmission unit 13 can transmit through the bus 15 for corresponding processes, for example, stored (by data storage unit 17), computed (by core computing unit 11), image processed (by image processor 16a, 16b), transmitted (through hub and the electrode 1311 of display panel 131) or other processes.

Additionally, other technical features of the local system 1c, 1d, 1e in FIGS. 3-5 can be referred to the local system 1 in FIG. 1.

In summary, in the data transmission architecture of the present invention, the information exchange between the local system and the peripheral system includes one of the following ways: a first electrical signal is transmitted by the electrode of the display panel of the image transmission unit and the receiving device of the peripheral system receives this first electrical signal by coupling and obtains the transmission data; or, a second electrical signal is transmitted by the transmitting device of the peripheral system and the receiving module of the image transmission unit receives this signal and obtains a receiving data which is sent from receiving module to the peripheral hub. In this way, not only data or file can be transmitted in a short distance, it can also act jointly with the existing communication system to expand the applications of the electronic system. Additionally, in present invention, the display panel of the image transmission unit is not only applied for displaying images, but also for data transmission in short distances, which may further expand the applications of the electronic system.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A data transmission architecture comprising:
a local system comprising at least one processor, an image transmission unit and a peripheral hub, the peripheral hub electrically connected with the processor and the image transmission unit, the image transmission unit comprising a display panel and a receiver, the display panel comprising a display matrix and a driving circuit, wherein the display matrix includes a plurality of row electrodes and a plurality of column electrodes for displaying and for transmitting information wirelessly, the processor and the peripheral hub integrating and processing a display data of the display panel to be displayed as images on the display panel and a transmission data for transmitting information from the display panel and then sending the display data and the transmission data to the image transmission unit, the driving circuit receiving the display data and transmission data and converting the display data and transmission data into a first electrical signal to drive the display matrix to display image according to the display data and to drive the display matrix to wirelessly transmit information according to the transmission data; and
a peripheral system comprising a receiving device and a transmitting device;
wherein, information transmission between the local system and the peripheral system is performed in one of the following ways:
using at least one of the row electrodes and the column electrodes of the display matrix to wirelessly transmit the first electrical signal, and using the receiving device to couple and receive the first electrical signal to retrieve the transmission data; or
using the transmitting device to transmit a second electrical signal, using the receiver to retrieve a receiving data, and the receiver sending the receiving data to the peripheral hub.

2. The data transmission architecture of claim 1, wherein the transmission data is a picture, a video, a sound data, a text document, a password, an encoded file or a combination of those.

3. The data transmission architecture of claim 1, wherein the transmission data comprises a data tag, and the data tag comprises information to identify the peripheral system.

4. The data transmission architecture of claim 1, wherein the transmission data comprises a data tag, and the data tag comprises information to identify the local system.

5. The data transmission architecture of claim 1, wherein the receiving data comprises a data tag, and the data tag comprises information to identify the local system.

6. The data transmission architecture of claim 1, wherein the receiving data comprises a data tag, and the data tag comprises information to identify the peripheral system.

7. The data transmission architecture of claim 1, wherein the peripheral hub receives the receiving data and then transmits the receiving data to another unit of the local system or other peripheral systems according to contents of the receiving data.

8. The data transmission architecture of claim 1, wherein the display data and the transmission data are integrated by a software program, a piece of hardware or a firmware.

9. The data transmission architecture of claim 1, wherein the image transmission unit further comprises a transmitter and the information transmission between the local system and the peripheral system further comprises:
separately or simultaneously transmitting the transmission data through the at least one electrode of the display panel or through the transmitter.

10. The data transmission architecture of claim 1, wherein the peripheral system can include a Bluetooth device, or a radio frequency unit, or a speaker, or a microphone, or a camera, or a video camera, or a multi-function printer, or a keyboard, or a mouse, or a storage device, or a payments device, or a cash machine, or a data query device or their combination.

\* \* \* \* \*